(12) United States Patent
Biwer et al.

(10) Patent No.: US 7,660,742 B2
(45) Date of Patent: Feb. 9, 2010

(54) METHOD OF AND SYSTEM FOR PROCESSING PURCHASE ORDERS

(75) Inventors: Michael Biwer, Lauterbach (DE); Alexander Grendel, Bad Schönborn (DE); Markus Welter, Ottweiler (DE)

(73) Assignee: SAP Aktiengesellschaft, Walldorf, DE (US)

( * ) Notice: Subject to any disclaimer, the term of this patent is extended or adjusted under 35 U.S.C. 154(b) by 292 days.

(21) Appl. No.: 10/932,913

(22) Filed: Sep. 2, 2004

(65) Prior Publication Data

US 2005/0197915 A1  Sep. 8, 2005

Related U.S. Application Data

(60) Provisional application No. 60/551,221, filed on Mar. 8, 2004, provisional application No. 60/563,284, filed on Apr. 16, 2004.

(51) Int. Cl.
*G06Q 30/00* (2006.01)
(52) U.S. Cl. ........................................ 705/26
(58) Field of Classification Search ............... 705/26, 705/27
See application file for complete search history.

(56) References Cited

U.S. PATENT DOCUMENTS

| | | | |
|---|---|---|---|
| 4,750,119 A | 6/1988 | Cohen et al. | |
| 4,752,877 A | 6/1988 | Roberts et al. | |
| 5,297,250 A | 3/1994 | Leroy et al. | |
| 5,315,508 A | 5/1994 | Bain et al. | |
| 5,400,253 A | 3/1995 | O'Connor | |
| 5,500,513 A | 3/1996 | Langhans et al. | |
| 5,615,109 A | 3/1997 | Eder | |
| 5,621,201 A | 4/1997 | Langhans et al. | |
| 5,758,327 A | 5/1998 | Gardner et al. | |
| 5,832,496 A | 11/1998 | Anand et al. | |
| 5,870,716 A | 2/1999 | Sugiyama et al. | |
| 5,878,400 A | 3/1999 | Carter, III | |
| 5,920,846 A | 7/1999 | Storch et al. | |

(Continued)

FOREIGN PATENT DOCUMENTS

JP  2004030343 A  * 1/2004

(Continued)

OTHER PUBLICATIONS

Author unknown, "Staffware: Staffware And Biomni Join Forces To Provide End-To-End E-Procurement Solution With Enhanced Workflow Capability: Self-Service Functionality Will Enable Thousands Of Transactions To Be Handled Daily From The Desktop," M2 Presswire, Coventry, Feb. 6, 2001, p. 1.*

(Continued)

*Primary Examiner*—Amee A Shah
(74) *Attorney, Agent, or Firm*—Foley & Lardner LLP

(57) ABSTRACT

A method of and system for processing a purchase order. The method of processing a purchase order includes receiving data regarding the purchase order in a computerized system, wherein the purchase order has been rejected based on the application of at least one rule. The method also includes providing options to facilitate acceptance of the purchase order. The system for processing a purchase order includes means for receiving data regarding the purchase order, wherein the purchase order has been rejected based on the application of at least one rule. The system further includes means for providing options to facilitate acceptance of the purchase order.

33 Claims, 6 Drawing Sheets

U.S. PATENT DOCUMENTS

| | | |
|---|---|---|
| 5,930,769 A | 7/1999 | Rose |
| 5,930,771 A | 7/1999 | Stapp |
| 5,943,652 A | 8/1999 | Sisley et al. |
| 5,953,707 A | 9/1999 | Huang et al. |
| 5,999,914 A | 12/1999 | Blinn et al. |
| 6,014,648 A | 1/2000 | Brennan |
| 6,029,139 A | 2/2000 | Cunningham et al. |
| 6,064,984 A | 5/2000 | Ferguson et al. |
| 6,115,690 A | 9/2000 | Wong |
| 6,151,588 A * | 11/2000 | Tozzoli et al. ................ 705/37 |
| 6,185,550 B1 | 2/2001 | Snow et al. |
| 6,260,024 B1 | 7/2001 | Shkedy |
| 6,285,916 B1 | 9/2001 | Kadaba et al. |
| 6,341,351 B1 | 1/2002 | Muralidhran et al. |
| 6,366,890 B1 | 4/2002 | Usrey |
| 6,484,149 B1 | 11/2002 | Jammes et al. |
| 6,505,093 B1 | 1/2003 | Thatcher et al. |
| 6,507,851 B1 | 1/2003 | Fujiwara et al. |
| 6,647,380 B1 | 11/2003 | Yotsukura |
| 6,671,676 B1 | 12/2003 | Shacham |
| 6,701,299 B2 | 3/2004 | Kraisser et al. |
| 6,721,715 B2 | 4/2004 | Nemzow |
| 6,725,204 B1 | 4/2004 | Gusley |
| 6,868,528 B2 | 3/2005 | Roberts |
| 6,910,017 B1 | 6/2005 | Woo et al. |
| 6,980,966 B1 * | 12/2005 | Sobrado et al. ................ 705/26 |
| 7,080,030 B2 | 7/2006 | Eglen et al. |
| 7,082,408 B1 | 7/2006 | Baumann et al. |
| 7,082,426 B2 | 7/2006 | Musgrove et al. |
| 7,092,929 B1 | 8/2006 | Dvorak et al. |
| 7,096,189 B1 | 8/2006 | Srinivasan |
| 7,107,268 B1 | 9/2006 | Zawadzki et al. |
| 7,117,165 B1 * | 10/2006 | Adams et al. ................ 705/26 |
| 7,124,098 B2 | 10/2006 | Hopson et al. |
| 7,124,984 B2 | 10/2006 | Yokouchi et al. |
| 7,139,731 B1 * | 11/2006 | Alvin ........................ 705/35 |
| 7,188,080 B1 | 3/2007 | Walker et al. |
| 7,216,086 B1 | 5/2007 | Grosvenor et al. |
| 7,283,975 B2 | 10/2007 | Broughton |
| 7,343,315 B2 | 3/2008 | Wittmer et al. |
| 7,346,656 B2 | 3/2008 | Worthen |
| 7,499,877 B2 | 3/2009 | Carr et al. |
| 7,516,083 B1 | 4/2009 | Dvorak et al. |
| 7,523,048 B1 | 4/2009 | Dvorak |
| 2001/0011295 A1 | 8/2001 | Kobayashi et al. |
| 2001/0013731 A1 | 8/2001 | Shinohara et al. |
| 2001/0019778 A1 | 9/2001 | Gardaz et al. |
| 2001/0032130 A1 | 10/2001 | Gabos et al. |
| 2001/0034673 A1 | 10/2001 | Yang et al. |
| 2001/0039517 A1 | 11/2001 | Kawakatsu |
| 2001/0049634 A1 | 12/2001 | Stewart |
| 2002/0012390 A1 | 1/2002 | Kim |
| 2002/0013731 A1 | 1/2002 | Bright et al. |
| 2002/0019778 A1 | 2/2002 | Isaacson et al. |
| 2002/0023500 A1 | 2/2002 | Chikuan et al. |
| 2002/0026368 A1 | 2/2002 | Carter, III |
| 2002/0059108 A1 | 5/2002 | Okura et al. |
| 2002/0059122 A1 | 5/2002 | Inoue et al. |
| 2002/0062314 A1 | 5/2002 | Hisasue et al. |
| 2002/0072986 A1 | 6/2002 | Aram |
| 2002/0073114 A1 | 6/2002 | Nicastro et al. |
| 2002/0078159 A1 | 6/2002 | Petrogiannis et al. |
| 2002/0099563 A1 | 7/2002 | Adendorff et al. |
| 2002/0099579 A1 | 7/2002 | Stowell et al. |
| 2002/0107713 A1 * | 8/2002 | Hawkins .................... 705/8 |
| 2002/0116241 A1 | 8/2002 | Sandhu et al. |
| 2002/0120523 A1 | 8/2002 | Yang |
| 2002/0120533 A1 | 8/2002 | Wiesenmaier |
| 2002/0123930 A1 | 9/2002 | Boyd et al. |
| 2002/0128946 A1 | 9/2002 | Chehade et al. |
| 2002/0138290 A1 | 9/2002 | Metcalfe et al. |
| 2002/0138360 A1 | 9/2002 | Inoue et al. |
| 2002/0143644 A1 | 10/2002 | Tosun et al. |
| 2002/0143690 A1 * | 10/2002 | Mahajan et al. ................ 705/37 |
| 2002/0147622 A1 | 10/2002 | Drolet et al. |
| 2002/0147668 A1 | 10/2002 | Smith et al. |
| 2002/0152128 A1 | 10/2002 | Walch et al. |
| 2002/0156858 A1 | 10/2002 | Hunter |
| 2002/0165782 A1 | 11/2002 | Falkenstein et al. |
| 2002/0184116 A1 | 12/2002 | Tam et al. |
| 2002/0188524 A1 | 12/2002 | Shimizu |
| 2003/0023500 A1 | 1/2003 | Boies et al. |
| 2003/0028393 A1 | 2/2003 | Coulston et al. |
| 2003/0028437 A1 | 2/2003 | Grant et al. |
| 2003/0046120 A1 | 3/2003 | Hoffman et al. |
| 2003/0046195 A1 * | 3/2003 | Mao ........................ 705/30 |
| 2003/0050852 A1 | 3/2003 | Liao et al. |
| 2003/0065574 A1 | 4/2003 | Lawrence |
| 2003/0074269 A1 | 4/2003 | Viswanath |
| 2003/0083961 A1 | 5/2003 | Bezos et al. |
| 2003/0120528 A1 * | 6/2003 | Kruk et al. .................... 705/7 |
| 2003/0126024 A1 | 7/2003 | Crampton et al. |
| 2003/0144916 A1 | 7/2003 | Mumm et al. |
| 2003/0149631 A1 | 8/2003 | Crampton et al. |
| 2003/0149674 A1 | 8/2003 | Good et al. |
| 2003/0158791 A1 | 8/2003 | Gilberto et al. |
| 2003/0171998 A1 | 9/2003 | Pujar et al. |
| 2003/0172007 A1 | 9/2003 | Helmolt et al. |
| 2003/0187767 A1 | 10/2003 | Crites et al. |
| 2003/0200150 A1 | 10/2003 | Westcott et al. |
| 2003/0200156 A1 | 10/2003 | Roseman et al. |
| 2003/0200168 A1 | 10/2003 | Cullen, III et al. |
| 2003/0208365 A1 | 11/2003 | Avery et al. |
| 2003/0229502 A1 | 12/2003 | Woo |
| 2003/0236721 A1 | 12/2003 | Plumer et al. |
| 2004/0006522 A1 | 1/2004 | Keane et al. |
| 2004/0010463 A1 | 1/2004 | Hahn-Carlson et al. |
| 2004/0015367 A1 | 1/2004 | Nicastro et al. |
| 2004/0019528 A1 | 1/2004 | Broussard et al. |
| 2004/0098358 A1 | 5/2004 | Roediger |
| 2004/0122689 A1 | 6/2004 | Dailey et al. |
| 2004/0158507 A1 | 8/2004 | Meek, Jr. et al. |
| 2004/0162763 A1 * | 8/2004 | Hoskin et al. ................ 705/26 |
| 2004/0172321 A1 | 9/2004 | Vemula et al. |
| 2004/0186763 A1 | 9/2004 | Smith |
| 2004/0186765 A1 | 9/2004 | Kataoka |
| 2004/0186783 A1 | 9/2004 | Knight et al. |
| 2004/0210489 A1 | 10/2004 | Jackson et al. |
| 2004/0220861 A1 | 11/2004 | Morciniec et al. |
| 2004/0249722 A1 | 12/2004 | Sugamura et al. |
| 2004/0267674 A1 | 12/2004 | Feng et al. |
| 2005/0015303 A1 | 1/2005 | Dubin et al. |
| 2005/0055283 A1 | 3/2005 | Zarovinsky |
| 2005/0060270 A1 | 3/2005 | Ramakrishnan |
| 2005/0075915 A1 | 4/2005 | Clarkson |
| 2005/0075941 A1 | 4/2005 | Jetter et al. |
| 2005/0086122 A1 | 4/2005 | Cirulli et al. |
| 2005/0086125 A1 | 4/2005 | Cirulli et al. |
| 2005/0096122 A1 | 5/2005 | Nireki et al. |
| 2005/0096125 A1 | 5/2005 | LeMay et al. |
| 2005/0096963 A1 | 5/2005 | Myr et al. |
| 2005/0102175 A1 | 5/2005 | Dudat et al. |
| 2005/0102192 A1 * | 5/2005 | Gerrits et al. ................ 705/26 |
| 2005/0102227 A1 * | 5/2005 | Solonchev .................... 705/39 |
| 2005/0131807 A1 | 6/2005 | Schaefer et al. |
| 2005/0165659 A1 | 7/2005 | Gruber |
| 2005/0171825 A1 | 8/2005 | Denton et al. |
| 2005/0197912 A1 | 9/2005 | Wittmer et al. |
| 2005/0197913 A1 | 9/2005 | Grendel et al. |
| 2005/0197914 A1 | 9/2005 | Welter et al. |
| 2005/0197915 A1 | 9/2005 | Biwer et al. |
| 2005/0197918 A1 | 9/2005 | Wittmer et al. |
| 2005/0197921 A1 | 9/2005 | Abo-Hasna et al. |
| 2005/0197949 A1 | 9/2005 | Welter et al. |

| | | | |
|---|---|---|---|
| 2005/0203813 A1 | 9/2005 | Welter et al. | |
| 2005/0216325 A1 | 9/2005 | Ziad et al. | |
| 2005/0216357 A1 | 9/2005 | Wittmer et al. | |
| 2005/0216359 A1 | 9/2005 | Welter et al. | |
| 2005/0216375 A1 | 9/2005 | Grendel et al. | |
| 2005/0235020 A1 | 10/2005 | Gabelmann et al. | |
| 2005/0240488 A1 | 10/2005 | Grendel et al. | |
| 2005/0243792 A1 | 11/2005 | Simon et al. | |
| 2005/0246482 A1 | 11/2005 | Gabelmann et al. | |
| 2005/0251734 A1 | 11/2005 | Gabelmann et al. | |
| 2006/0020512 A1 | 1/2006 | Lucas et al. | |
| 2006/0036507 A1 | 2/2006 | Pujar et al. | |
| 2006/0074746 A1 | 4/2006 | Kline et al. | |
| 2006/0074747 A1 | 4/2006 | Kline et al. | |
| 2006/0074748 A1 | 4/2006 | Kline et al. | |
| 2006/0074749 A1 | 4/2006 | Kline et al. | |
| 2006/0074751 A1 | 4/2006 | Kline et al. | |
| 2006/0112099 A1 | 5/2006 | Musgrove et al. | |
| 2006/0184401 A1 | 8/2006 | DelGaudio et al. | |
| 2007/0050272 A1 | 3/2007 | Godlewski et al. | |

FOREIGN PATENT DOCUMENTS

| | | |
|---|---|---|
| WO | WO 99/45450 A2 | 9/1999 |
| WO | WO 01/71635 A2 | 9/2001 |

OTHER PUBLICATIONS

Anon., "(A lot of) life after H. Ross: Electronic Data Systems", *Financial World*, vol. 162, No. 22, , Nov. 9, 1993 (p. 50(2)).

"Beyond Markdown Management", summer/autumn 03, *the 4caster*, Iss. 4, vol. 2.

Brown, Timothy Charles, "The Effects of Assortment Composition Flexibility on Operating Efficiency", (Abstract Only), *Dissertation Abstracts International*, vol. 55/08-A, available at least by 1994, (p. 2458).

Melcher, Rachel, "Local tech firm creates retail markdown tool", Mar. 24, 2000, *Cincinnati Business Courier* (3 pgs.).

Profitlogic, available at http://web.archive.org/web/2002060311838/, available at least by Apr. 15, 2005 (22 pp.).

"Retailers Manage Markdown Challenges Using i2 Solutions", Jan. 13, 2003, NFR 92nd Annual Convention & Expo (2 pgs.).

Subrahmanyan et al., "Developing optimal pricing and inventory policies for retailers who face uncertain demand", *Journal of Retailing*, vol. 72, No. 1, Spring, 1996 (p. 7(24)).

Wilson, Glenn T., "Changing the process of production", *Industrial Management*, vol. 37, No. 1, Jan./Feb. 1995 (pp. 1-2).

U.S. Appl. No. 60/374,892, filed Apr. 22, 2002, Krajec, Russell.

Abraham et al., "An Implemented System For Improving Promotion Productivity Using Store Scanner Data", Marketing Science, Summer 1993, vol. 12, No. 3, pp. 248-269.

Jensen et al., "Long-Term Construction Contracts: The Impact of Tamra '88 on Revenue Recognition", *Journal of Construction Education*, Spring 1997, vol. 2, No. 1, pp. 37-53.

Kelkar et al., Price Modeling in Standards for Electronic Product Catalogs Based on XML, 2002, pp. 366-375.

Srinivasan et al., Concepts and strategy guidelines for designing value enhancing sales promotions, Journal of Product and Brand Management, vol. 7, No. 5, 1998, pp. 410-420.

"New Pegasystems Enterprise Application Provides Central Hub for Proactively Managing Operational Exceptions", Business Wire, (recovered from Dialog database), Feb. 3, 2004, 4 pages.

Bartle et al., "A Review of State Procurement and Contracting", Journal of Public Procurement, 2003, vol. 3, Issue 2, pp. 192-214.

Chen et al., "Near-Optimal Pricing and Replenishment Strategies for a Retail/Distribution System", Operations Research, Nov./Dec. 2001, vol. 49, No. 6, pp. 839-853.

Chen et al., "Quantity and Due Date Quoting Available to Promise", Information Systems Frontier, Dec. 2001, vol. 3, No. 4, pp. 477-488.

Goodwin, David R., "The Open-to-Buy System and Accurate Performance Measurement", International Journal of Retail & Distribution Management, Mar./Apr. 1992, vol. 20, Issue 2, 7 pages.

Staib et al., "Purchasing and Supply Chain Management", Air Force Journal of Logistics, Fall 2002, vol. 26, No. 3, 9 pages.

US Notice of Allowance for U.S. Appl. No. 11/075,391 dated Aug. 31, 2009, 18 pages.

US Notice of Allowance for U.S. Appl. No. 11/071,982 dated Aug. 10, 2009, 15 pages.

US Office Action for U.S. Appl. No. 10/915,707 dated Apr. 13, 2009, 6 pages.

US Office Action for U.S. Appl. No. 10/915,707 dated Sep. 14, 2009, 11 pages.

US Office Action for U.S. Appl. No. 10/903,467 dated Jul. 23, 2009, 17 pages.

US Office Action for U.S. Appl. No. 11/075,391 dated May 22, 2009, 9 pages.

US Office Action for U.S. Appl. No. 11/075,392 dated May 12, 2009, 12 pages.

US Office Action for U.S. Appl. No. 11/074,368 dated Apr. 14, 2009, 13 pages.

US Office Action for U.S. Appl. No. 11/074,368 dated Aug. 19, 2009, 12 pages.

US Office Action for U.S. Appl. No. 10/933,127 dated Aug. 3, 2009, 21 pages.

US Office Action for U.S. Appl. No. 11/072,000 dated Jun. 11, 2009, 12 pages.

US Office Action for U.S. Appl. No. 10/915,263 dated Apr. 14, 2009, 12 pages.

US Office Action for U.S. Appl. No. 10/915,263 dated Sep. 9, 2009, 13 pages.

US Office Action for U.S. Appl. No. 11/075,393 dated Jun. 11, 2009, 23 pages.

US Office Action for U.S. Appl. No. 11/074,600 dated Jul. 16, 2009, 26 pages.

US Office Action for U.S. Appl. No. 10/981,384 dated Apr. 29, 2009, 9 pages.

* cited by examiner

METHOD OF AND SYSTEM FOR PROCESSING PURCHASE ORDERS

CROSS-REFERENCE TO RELATED PATENT APPLICATIONS

This application claims the benefit of U.S. Provisional Application No. 60/551,221, filed Mar. 8, 2004 and entitled "Inventory Management," and U.S. Provisional Application No. 60/563,284, filed Apr. 16, 2004 and entitled "Inventory Management," both of which are hereby incorporated by reference.

BACKGROUND

The present description relates generally to the field of methods of and systems for processing purchase orders, and more specifically to methods of and systems for applying rules to accept or reject the purchase orders.

Purchasing products and services from a supplier or provider typically involves sending a purchase order to the supplier requesting a specific number of items for a specific price. The number of items multiplied by the price of the items provides a total cost associated with the purchase order. Prior to sending the purchase order, the purchase order may need to be approved by an entity, such as a budgeting department. The entity may apply one or more rules to the purchase order in determining whether to approve the purchase order. For example, a rule may dictate that the approval is granted or denied based on whether incurring the total cost of the purchase order is acceptable in view of budget constraints. Accordingly, the purchase order is approved or rejected based on budget constraints prior to being sent to the supplier.

The rules that are applied to the electronic purchase order may be any of a plurality of types of rules. For example, the rule may be a budgeting rule. Budget rules describe the amount of money available to purchase merchandise for a given time period. During a pre-season planning and buying phase, the budget rules may be used by planners and buyers to control their purchasing budget. During a seasonal phase, the budget rules may be utilized in calculating performance as the budget rules are updated based on sales activity. For example, planners and buyers may monitor the updated budget rules to determine if each category's performance is proceeding according to plan or if corrective steps, such as price reductions or stopped orders, need to be taken to manage inventory.

The retail business can require that certain purchase orders be processed in a very short amount of time, while other purchase orders must be placed in advance of the desired delivery. For example, changes in current trends in the fashion industry may require that inventory be increased on short notice. Additionally, fashion articles may require ordering well in advance of delivery, in some cases six months or more in advance. For certain aspects of the fashion industry, items may be required to be ordered one or more seasons in advance. Further, tracking inventory and budgets for seasonal items can be important to the profitability of a business. For example, identifying a particularly fast selling item and ordering additional quantities of the fast selling item within a prescribed budget may increase the profitability of a retail location.

Moreover, increasing inventories on short notice during, for example, a seasonal phase, in order to accommodate increased demand due to a change in trends or a fast selling item will have an impact on the budgets planned for these items during a pre-season planning phase. For example, purchase orders generated for additional quantities of an item to meet an increased demand for the item may exceed the amount of funding budgeted for the item during the pre-season planning phase.

Thus, there is need for a method of and system for processing purchase orders that is configured to automatically approve or reject purchase orders based on the application of a rule. There is further need for such a system and method configured to provide a user with remedial options for purchase orders that have been rejected based on the application of the rule.

SUMMARY

According to an exemplary embodiment, a method of processing a purchase order includes receiving data regarding the purchase order in a computerized system, wherein the purchase order has been rejected based on the application of at least one rule. The method also includes providing options to facilitate acceptance of the purchase order.

According to another exemplary embodiment, a system for processing a purchase order includes means for receiving data regarding the purchase order, wherein the purchase order has been rejected based on the application of at least one rule. The system further includes means for providing options to facilitate acceptance of the purchase order.

According to another exemplary embodiment, a program product for processing a purchase order includes machine-readable program code for causing, when executed, one or more machines to perform the steps of receiving data regarding the purchase order, wherein the purchase order has been rejected based on the application of at least one rule, and providing options to facilitate acceptance of the purchase order.

Other features and advantages of the present invention will become apparent from the following detailed description and accompanying drawings. It should be understood, however, that the detailed description and specific examples are given by way of illustration and not limitation. Many modifications and changes within the scope of the present invention may be made without departing from the spirit thereof, and the invention includes all such modifications.

BRIEF DESCRIPTION OF THE DRAWINGS

The exemplary embodiments will hereafter be described with reference to the accompanying drawings, wherein like numerals depict like elements, and.

DETAILED DESCRIPTION

In the following description, for the purposes of explanation, numerous details are set forth in order to provide a thorough understanding of the present invention. It will be evident to one skilled in the art, however, that the exemplary embodiments may be practiced without these specific details. In other instances, structures and device are shown in diagram form in order to facilitate description of the exemplary embodiments. Furthermore while the embodiments described herein refer primarily to retail products or retail sales articles, it is envisioned that the present description will be applicable to the sale of any type of product or service.

Figure 1:
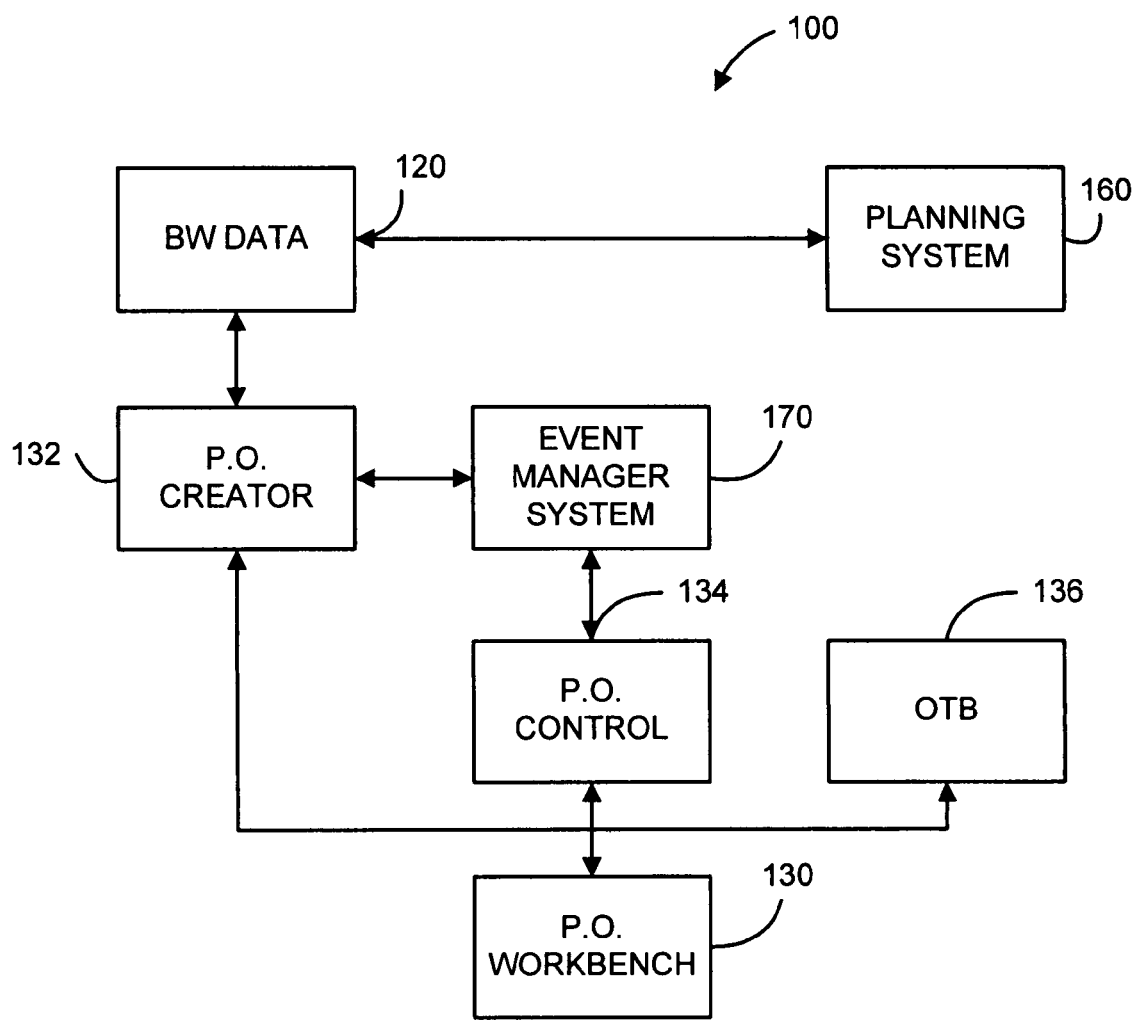
FIG. 1 is a general block diagram illustrating a system for processing data related to retail operations and planning, according to an exemplary embodiment.

Referring now to FIG. 1, a general block diagram is shown illustrating an open-to-buy (OTB) system 100 for processing data related to retail operations and planning, according to exemplary embodiment. The OTB system 100 includes a data warehouse 120, a purchase order creator 132, an OTB control system 130 and a purchase order control system 134.

The OTB system 100 may be implemented as a workbench that may be a data processing system or software configured to control, display, interface with operators, or perform other operations to manage purchase orders. The OTB control system 130 is preferably implemented in an SAP-based workbench, interface, and architecture, but any other systems may be utilized.

The OTB system 100 may be implemented as a single system, a distributed system, or any combination thereof. The OTB system 100 may be implemented using a single computing system, a plurality of computing systems, software, hardware, or any other system or combination of systems to perform the functions described herein.

Data warehouse 120 is a data repository configured to receive, sort, and process information related to retail operations and planning. The data warehouse 120 may also be implemented as using a single or multiple systems. The data warehouse 120 may further include one or more functions associated with it to permit a user to efficiently organize and retrieve stored data. The OTB system 100 is sufficiently flexible to accommodate any of a variety of types of data warehouses 120, such as databases, for example.

In certain embodiments, the data warehouse 120 may be adapted to generate rules or checks to be used in the processing of purchase orders. In other embodiments, a planning system 160 may be provided to generate planning data, rules, checks and budgets, and to provide such information to the data warehouse 120. In this regard, the rules or checks may include a planning data or planning budgets including budget buckets corresponding to delivery periods and order periods, for example. The planning data or budgets are provided by the data warehouse 120 to the OTB control system 130, which may be included in a purchase order workbench.

The purchase order workbench may be a data processing system configured to allow a user to create, monitor, and receive approval for purchase orders for obtaining products or other supplies from a supplier. According to an exemplary embodiment, the purchase order creator 132, the purchase order control system 134, and the open-to-buy control system 130 are included in the workbench.

Purchase order creator 132 may be any system or method for creating electronic purchase orders. An electronic purchase order may be any type of purchase order in an electronic format. Purchase order creator 132 may include one or more functions to facilitate creation of the electronic purchase order. For example, purchase order creator 132 may include an auto fill function to automatically populate an electronic purchase order with previously stored data. Additionally, purchase order creator 132 may include a user interface configured to receive and display purchase order information with a user. Upon creation of a purchase order, the purchase order creator 132 provides the purchase order information to the data warehouse 120 for use in future planning or recalculation of planning data or budget. The purchase order information is also provided to the purchase order control system 134. An event manager system 170 may be provided to facilitate communication between the purchase order creator 132 and the purchase order control system 134. The event manager system 170 may receive commands from the purchase order control system 134 to, for example, initiate the creation of a purchase order and may process that command by issuing a command to the purchase order creator 132.

Purchase order control system 134 may be any system for controlling and monitoring electronic purchase orders. Purchase order control system 134 includes one or more functions configured to allow a user to manipulate or receive information related to any existing purchase order. For example, a user may utilize purchase order control system 134 to retrieve information related to a specific purchase order and modify one or more attributes of the retrieved purchase order.

The purchase order control system 134 provides purchase order information to the OTB control system 130, which is configured to facilitate automated approval or rejection of electronic purchase orders including both procurement and budget check functions. The OTB control system 130 receives an electronic purchase order as input and applies one or more rules to the electronic purchase order to determine whether the electronic purchase order should be approved or rejected. The rules, or checks, are based on the planning budget which is based on the planning data received from the data warehouse 120. Planning budgets or buckets may be generated from the planning data at either the data warehouse 120, the OTB control system 130 or in another module lying between the two. According to an exemplary embodiment, the one or more rules includes at least one budget rule. A budget rule may define the amount of money that is available for a purchase order based on information contained in the purchase order. For example, a purchase order may include a time frame for the purchase order, and the rule may be used to define the amount of money that is available in that time frame. According to alternative embodiments, the one or more rules may also include rules directed to the timing during which purchase orders may be requested. In other embodiments, other types of rules may be incorporated into the OTB system 100. The OTB control system 130 will be further discussed below with reference to FIGS. 2-5.

According to alternative embodiments, a purchase order workbench may further include more, fewer, or different systems to facilitate creation, processing, and maintenance of purchase orders. Further, functions associated with one or more systems may alternatively be associated with one or more alternative systems. For example, purchase order creator 132 may be implemented as a component of purchase order control system 134.

Figure 2:
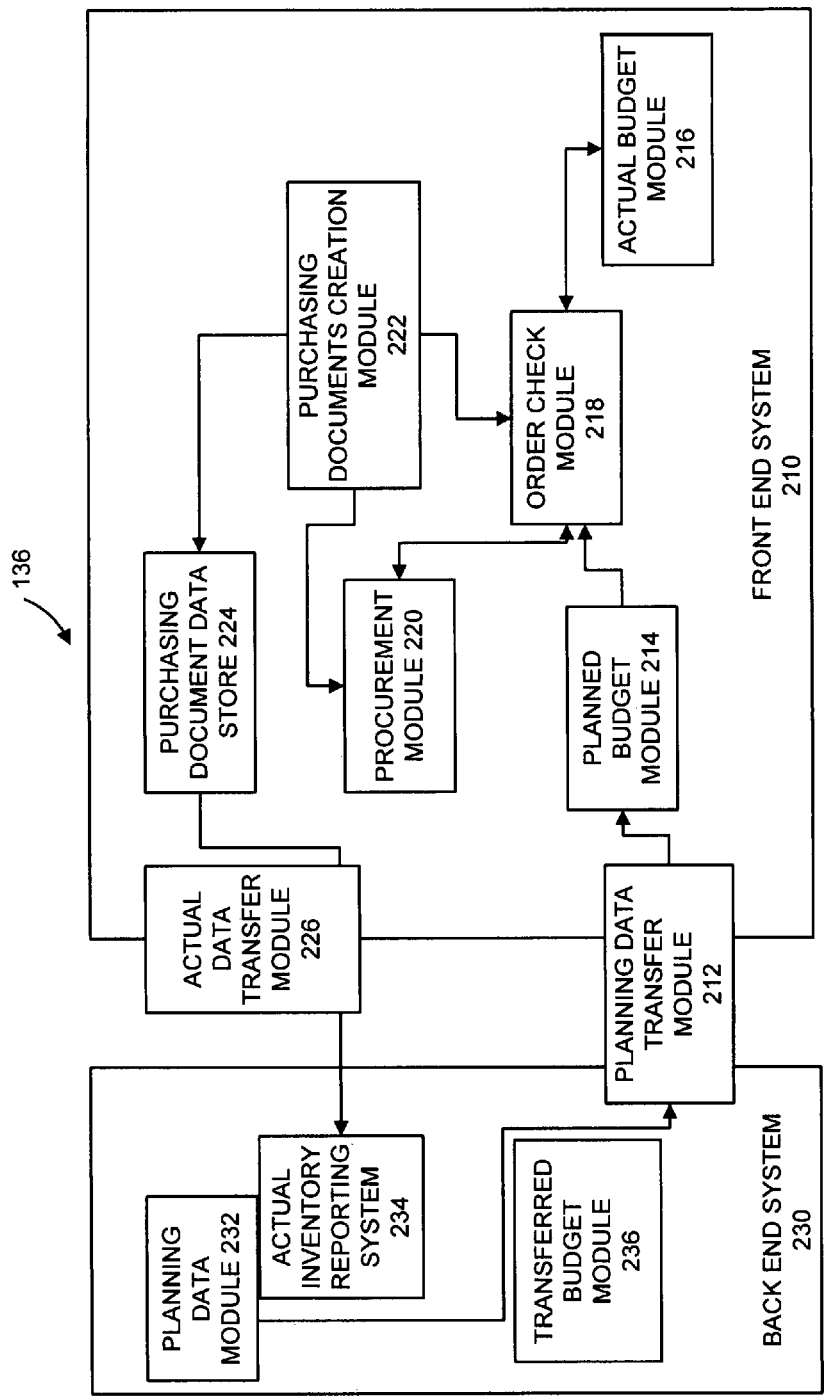
FIG. 2 is a block diagram illustrating an open to buy control system according to an exemplary embodiment.

Referring now to FIG. 2, a block diagram illustrates open to buy system 136, according to an exemplary embodiment. Open to buy system 136 includes a plurality of components configured to implement one or more functions to facilitate acceptance or rejection of an electronic purchase order. Open to buy system 136 may be implemented as a purchase order processing system as will be further discussed below with reference to FIGS. 3-5.

Open to buy system 136 includes a front-end system 210 configured to provide an interface between one or more users and a back-end system 230, according to an exemplary embodiment. Although shown as separate components, front-end system 210 and back-end system 230 may alternatively be implemented as a single system. Yet further, open to buy system 136 may include a plurality of either front-end systems 210 or back-end systems 230. For example, open to buy system 136 may include a plurality of front-end systems 210 to allow multiple users in distributed locations to access uniform and synchronized information stored on backend system 230.

Further, each of the front-end system 210 and the back-end system 230 may further be configured to each include lower-level front-end and back-end systems. In this regard, one or both of the front-end system 210 and the back-end system 230 may include components which allow user interaction and components which interface with other modules.

Front-end system 210 is configured to allow one or more users to perform a functions implemented using open to buy system 136. In the illustrated exemplary embodiment, the front-end system 210 includes a planning-data transfer module 212 adapted to receive data from the back-end system 230. The data received may include, for example, planned budget buckets, sales and budgeting information based on prior experience, current market conditions, and other factors. Additional detail relating to the planning data and its generation is provided below with reference to the description of the back-end system 230.

The planning-data transfer module 212 may generate a budget or a set of budget buckets, or budget portions, based on the planning data received from the back-end system 230. The budget information generated can then be stored in a planned budget module 214. In other embodiments, the planning-data transfer module 212 may receive and transfer raw planning data, and the planned budget module 214 may generated the budget information. In still further embodiments, the budget information may be generated within the back-end system 230 and forwarded to the planned budget module 214 through the planning data transfer module 212.

When a purchase order is received or submitted for processing, the front-end system 210 applies a set of checks or rules to determine whether the order should be processed as submitted. In this regard, the front-end system 210 is provided with an order check module 218. The order check module 218 accesses budget information from the planned budget module 214 to perform the necessary checks.

The order check module 218 may be configured to apply one or more open to buy rules to an electronic purchase order to determine whether the electronic purchase order should be accepted or rejected. A budget rule may be a type of open to buy rule. The order check module 218 may include a currency translation function configured to convert generic financial information to specific financial information relevant to the current user of front-end system 210. Status processing function 218 may be any function configured to determine whether no check was performed, a positive check result was received or a negative check result was received.

If the order check module 218 determines that the purchase order can be processed, the order is forwarded to a procurement module 220, which may communicate, directly or indirectly, with a computer at a supplier or a vendor to place the order. The procurement module 220 may be configured to receive and process information related to the creation, modification, or cancellation of an electronic purchase order.

If, on the other hand, the order check module 218 determines that the rules do not allow the purchase order to be processed as submitted, the order, the rules, the budget or a combination thereof may be modified to allow the processing of the purchase order. The front-end system 210 may be provided with an actual budget module 216 to store budget information which may have been updated or revised by the order check module 218.

Once the order has been placed by the procurement module 220, a confirmation may be received from the supplier or vendor. The information relating to the placement of the order may be generated by a purchasing documents creation module 222. In this regard, the information may include any revisions to the purchase order required by the order check module 218. The information generated by the purchasing documents creation module 222 may then be stored in a purchasing documents data store 224. In certain embodiments, an actual data transfer module 226 may be provided to supply the actual order and budget information to the back-end system for planning purposes.

According to alternative embodiments, front-end system 210 may include more, fewer, and/or different functions to provide a user interface and perform calculations related to purchase order processing. The described functions may be implemented using hardware, software, integrated circuits or any system configured to perform the functions described herein.

Back-end system 230 is configured to process data, store data, facilitate planning, provide reporting, and provide other functions associated with purchase order management using one or more functions and/or components. The back-end system 230 includes a planning data module 232 adapted to generate a merchandise ordering plan including all planned data e.g. planned sales, planned margin, planned inventory, planned receipts and planned budget buckets. The merchandise ordering plan may include information relevant to, for example, order scheduling and budgeting. The planning data module 232 may be configured to receive information from at least an order forecasting system and an actual inventory reporting system 234. The order forecasting system (not shown) may include information from various sources, such as industry outlook reports, relating to expected market conditions, for example, The actual inventory reporting system 234 provides information to the planning data module 232 relevant to the actual inventory currently available, which may include expected deliveries. In this regard, the actual inventory reporting system 234 may include information received from the front-end system 210, through the actual data transfer module 226, relating to purchase orders already placed.

In certain embodiments, the planning data module 232 may be adapted to generate budget information. The budget information may be stored within the back-end system 230 in a transferred budget module 236. Transferred budget module 236 may be used to store planned budget buckets that have been released and or transferred to planned budget module 214 or the transferred budget module. This may be used to reduce data traffic that only the changed and new buckets are transferred from planning data module 232 and Transferred budget module 236 to planned budget module 214.

As noted above, the generation of the budget information from the planning information may be accomplished by either the planning-data module 232, the planning data transfer module 212 or the planned budget modules 214, 236. In this regard, the budget information may include a budget allocation into a plurality of budget portions, or buckets, each corresponding to, for example, a delivery period, an order period, a merchandise category or a combination thereof.

According to alternative embodiments, backend system 230 may include more, fewer, and/or different functions to provide information and perform calculations related to purchase order processing.

Calculate open to buy rule transferred budget module 236 may be a function configured to generate one or more rules or functions to be applied to an electronic purchase order to determine whether the electronic purchase order should be accepted or rejected. The generation of the one or more rules and their application to electronic purchase orders are further discussed below with reference to FIG. 5.

Front-end system 210 and backend system 230 may be associated with one or more interface calls. An interface call is a message sent between front-end system 210 and back end system 230 or within either system. The interface call may be a request for information, a request for processing, and/or a communication of data. Each interface call may be associated with one or more functions or components within open to buy system 136.

A purchase order processing interface call is a communication from front-end system 210 to back-end system 230 communicating a request for the creation, modification, and/or cancellation of a purchase order. Modifications may include changes to amounts, changes to timing information, or any other modification. Based upon receipt of an interface call, the back-end system 230 is configured to create, modify, and/or cancel a purchase order.

A calculate open to buy rule interface call is a communication from back-end system 230 to front-end system 210 including an open to buy rule to be applied to electronic purchase orders. Based upon receipt of the open to buy rule, the front-end system 210 may be configured to store the open to buy rule for application to future electronic purchase order requests in, for example, the order check module 218, which may further be configured to perform a validation check on the open to buy rule upon receipt as further described below with reference to FIG. 3.

An open to buy interface call is a communication from planned budget module 214 to order check module 218 within the back-end system 230 including planning information to be used in the generation of open to buy rules. The budget planning information may include at least planned receipts, pending purchase orders, open purchase orders, order forecasts, receipts, and the change in end of planning period inventory. The interface call may further include a transfer from the order check module 218 to the used budget module 216. The transferred information may include used budget information according to existing purchase orders.

Figure 3:
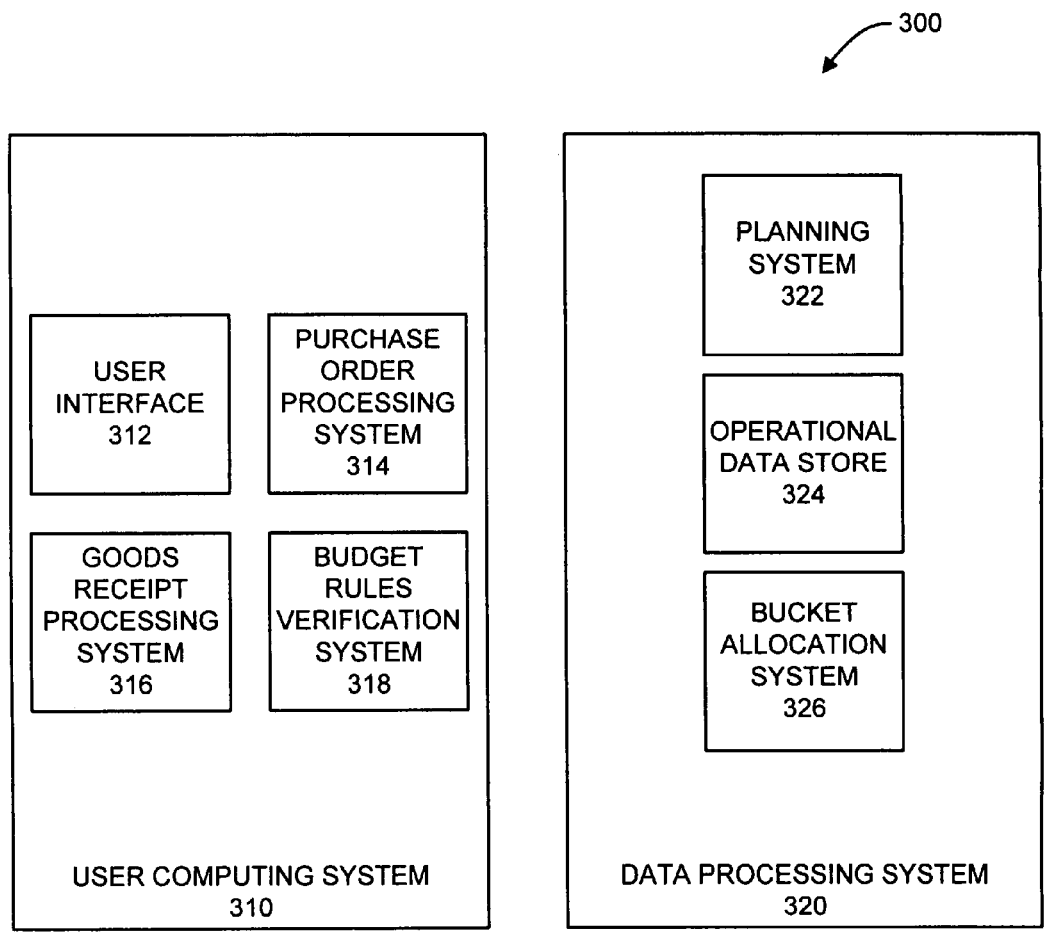
FIG. 3 is a general block diagram illustrating a purchase order processing system for processing electronic purchase orders according to an exemplary embodiment.

Referring now to FIG. 3, a block diagram illustrates a purchase order processing system 300 for processing electronic purchase orders, according to an exemplary embodiment. Purchase order processing system 300 includes a user computing system 310 and a data processing system 320. Although shown as separate systems, system 310 and system 320 may be implemented as a single system. Further, functions associated with either system 310 or system 320 may alternatively be associated with the other of system 310 or system 320 or implemented within a stand-alone system.

According to an exemplary embodiment, system 300 may be implemented using a single computing system. Accordingly, system 300 may be any type of computing device, including work stations, laptops, notebooks, personal digital assistants (PDAs), or other equipment configured to receive input, store data in a memory, execute a series of instructions, and provide an output. System 300 may include a processor configured to execute a set instructions or computer program, such as an Intel® PENTIUM® processor sold by Intel Corp. of Santa Clara, Calif.

According to an alternative embodiment, system 300 may be implemented using computing systems in a networked environment. System 300 may include a first computing system implementing user computing system 310, a communication network, and a second computing system implementing data processing system 320. The first and second computing systems may be any type of computer system, such as the computer system described above. The first and second computing systems further include devices for communicating over the communication network.

According to an exemplary embodiment, the communication network may be the Internet. According to alternative embodiments, the communication network may be any other type of network, such as a virtual private network (VPN), an Ethernet, or a Netware network. Further, the network can include a configuration, such as, a wide area network (WAN) or a local area network (LAN).

According to an alternative embodiment, system 300 may include a plurality of user computing systems 310. For example, wherein system 300 is configured to operate in a networked environment, system 300 may include multiple user computing systems 310 configured to communicate with data processing system 320 over the communication network. System 300 may further include a plurality of data processing systems 320. The data processing systems 320 may be in communication with each other such that uniform rules are provided to the user computing system 310, further discussed below with reference to FIG. 5.

User computing system 310 may be any type of system configured to allow a user to enter and receive data related to electronic purchase order processing. For example, user computing system 310 may include a user interface configured to allow a user to input details related to a purchase order request. The details may include an item to be purchased, a number of items to be purchased, a total cost of items to be purchased, a time frame for delivery of items to be purchased, a payment due date for items to be purchased, etc. An exemplary user interface 312 is further described below.

User computing system 310 may further be configured to generate or receive an electronic purchase order. An electronic purchase order may be any type of purchase order stored in an electronic format.

User computing system 310 may further be configured to provide a user with the results of an electronic purchase order processing. For example, wherein an electronic purchase order is approved, user computing system 310 may be configured to display the approval to the user. User computing system 310 may further be configured to perform additional tasks related to the approval, such as, printing out the approved purchase order, forwarding the purchase order to the target supplier, updating pending order values, modifying rules, etc. These additional tasks are discussed in further detail below with reference to FIGS. 4 and 5.

Alternatively, wherein an electronic purchase order is rejected, user computing system 310 may be configured to display the rejection to a user and present the user with choices for remedial actions based on the rejection. For example, user computing system 310 may redisplay the rejected purchase order such that the user can modify one or more attributes of the rejected purchase order and resubmit the purchase order. User computing system 310 may further provide the user with feedback based on the rejection to advise the user in making amendments to the rejected purchase order. Exemplary advice can include limitations on the number of items that can be ordered, limitations on the total cost for the purchase order, limitations on the time frame for the order, description of other pending orders, etc.

Alternatively, user computing system 310 may be configured to initiate a procurement process based upon a rejection of the electronic purchase order. Alternatively, where a purchase order is rejected, certain classes of users may be allowed to modify the budget rules such that the purchase order will be allowed. For example, a class of users may have approval to override normal budget rules in special circumstances, as will be further discussed below with reference to FIG. 5.

User computing system 310 includes a user interface 312, a purchase order approval system 314, a goods receipt logging system 316, and a budget rules verification system 318. User computing system 310 may further include additional, different, and/or fewer components and/or subsystems configured to facilitate purchase order processing.

User interface 312 may be any type of user interface configured to facilitate interaction between a user and user computing system 310 and/or data processing system 320. According to an exemplary embodiment, user interface 312 may include a plurality of selectable links configured to allow the user to access functionality provided by or through user computing system 310. User interface 312 further includes a plurality of input and output fields, the input fields configured to receive information from the user and the output fields configured to display information to the user.

Purchase order request processing system 314 is a system configured to receive purchase order information from a user through user interface 312 or another source, generate an electronic purchase order, apply at least one rule to the electronic purchase order, and provide an acceptance or rejection of the electronic purchase order to the user through user interface 312 based on the application of the rule. Accordingly, purchase order request processing system 314 may include one or more of purchase order creator 132, purchase order control system 134, and/or open to buy system 136, as discussed above with reference to FIG. 1. Budget rules and the process for accepting or rejecting an electronic purchase order are provided in more detail below with reference to FIG. 5.

Goods receipt processing system 316 is a system for processing information related to the receipt of goods for an existing electronic purchase order. According to an exemplary embodiment, goods receipt processing system 316 is configured to receive goods receipt information from a user through user interface 312 and provide the information to data processing system 320. Data processing system 320 may be configured to utilize the goods receipt information to update budget rules as will be further discussed below with reference to FIG. 4.

Budget rules verification system 318 is a system configured to receive at least one budget rule from data processing system 320 and perform a verification check on the at least one budget rules.

Data processing system 320 may be any type of system configured to generate and maintain budget rules and associated data. Data processing system 320 includes a planning system 322, a budget rules Operational Data Store (ODS) 324, and a budget rules generation system 326.

Planning system 322 is a system configured to generate and provide planning data to budget rules ODS 324 such that rules ODS 324 can store the data to be used by rules generation system 326 generating the budget rules. The planning data may be data that is generated by planning system 322 or data that is received as an input to planning system 322. For example, planning system 322 is configured to receive at least order forecast information and actual inventory information as inputs. The order forecast information is a projection predicting information related to orders to be placed in the future. The actual inventory information contains the actual inventory for the user for which the budget rules are being generated. The input information may be received in real time, periodically, based on events, and/or manually entered as needed.

Planning system 322 may further be configured to send and receive information with budget rules ODS 324. This information can also be transferred in real time, periodically, based on events, and/or as needed.

Planning system 322 is further configured to generate budget rules reports. Budget rules reports contain a variety of information related to the creation and maintenance of the budget rules. Reports may be generated and customized for a variety of uses including strategic financial planning, store planning, merchandise planning, roll-out planning, etc. The planning system 322 is adapted to re-calculate a planned budget either manually or automatically. The recalculation may be based on actual data received, for example, from previous planning cycles.

Budget rules ODS 324 is an operation data store. ODS 324 is configured to receive and store all of the information from various sources needed to generate the budget rules. ODS 324 may further store additional information such as information used by planning system 322 in generating budget rules reports.

Exemplary information stored in ODS 324 may include planned receipts, pending purchase orders, open purchase orders, order forecast, receipts, and the difference between the planned inventory at the end of the planning period and the forecast inventory at the end of the planning period. The data may be stored and searchable according to a variety of key fields such as client name, week, month, delivery period, purchasing period, season type, season year, merchandise category, rollout date, season level, assortment level, organizational level, etc. Key fields may include any data category and can be used as a filtering criteria for the data. Thus, a customer or user may filter, sort, organize or retrieve the data based on any such key fields.

According to an exemplary embodiment, data stored in ODS 324 may be stored in a planning currency. Advantageously, utilizing a planning currency allows budget rules to be created independent of volatility or differences in currency. By removing currency differences and volatility, budget rules may be more uniformly and effectively applied.

Budget rules generating logic 326 is configured to access data stored in ODS 324 to generate at least one rule. According to an exemplary embodiment, the rule may be a budget rule. According to an exemplary embodiment, the at least one budget rule is a limit based on the amount of money available to purchase merchandise for a given time period. The creation of the at least one budget rule is further discussed below with reference to FIG. 4.

Data processing system 320 may further include more, fewer, or different configurations of subsystems and/or functions to perform the functions described herein. For example, data processing system 320 may include an inventory tracking system to facilitate generation of budget rules. Further, systems or function described as associated with a particular system or subsystem of system 100 may alternatively be associated with any other system within system 100. For example, budget rule calculations may alternatively be performed within data processing system 320.

Figure 4:
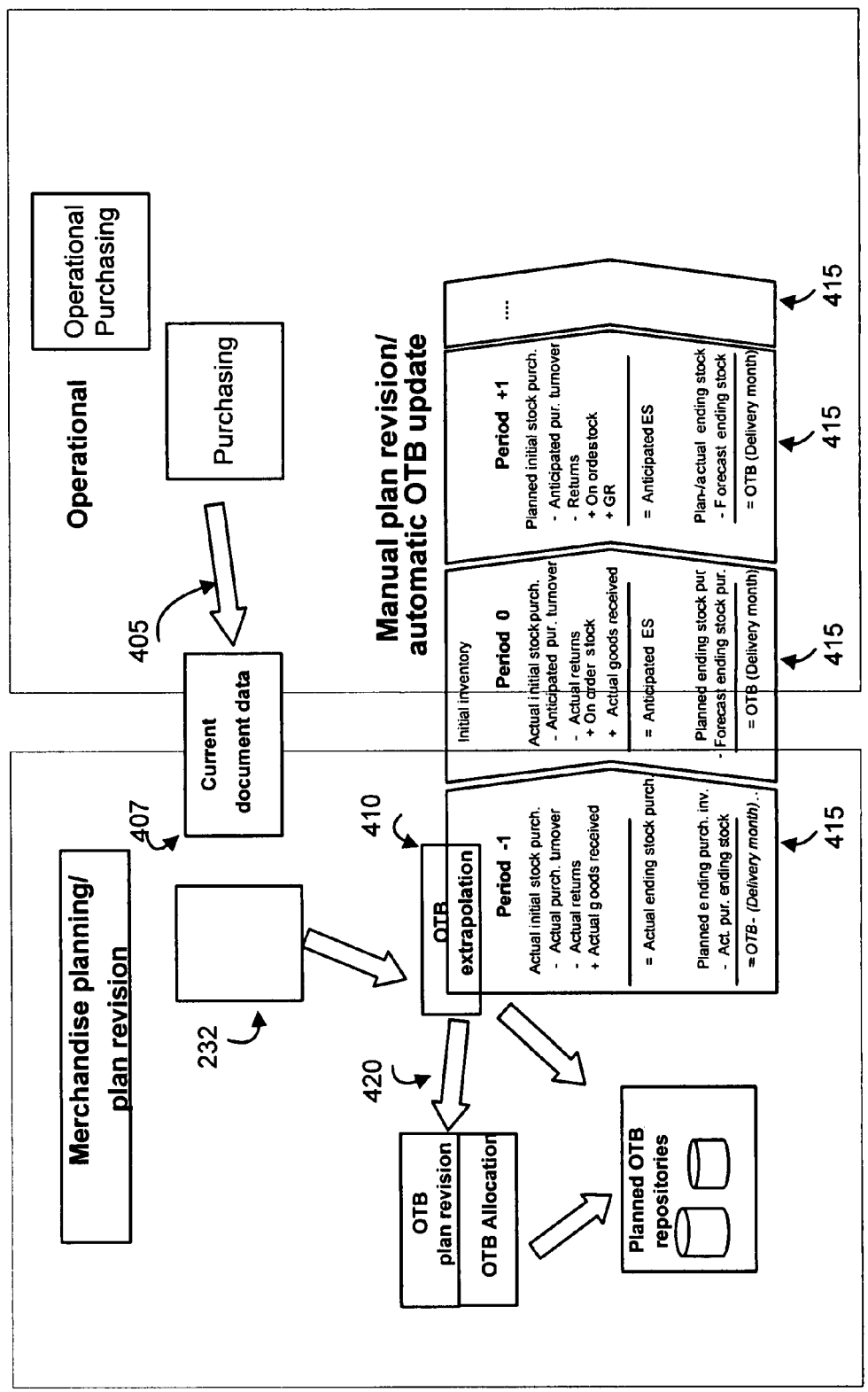
FIG. 4 is a flowchart illustrating a method for creating a budget rule according to an exemplary embodiment.

Referring now to FIG. 4, a block diagram 400 is shown illustrating a method for creating one or more budget rules according to an exemplary embodiment. The budget rules may be created by budget rules generating logic 326 using data stored in ODS 324 or from any other source.

In a step 405, data is received from a purchasing department indicating a contract to be associated with the budget rules. The specific contract may included in current document data 407 transferred to planning data module 232 and be directed to a particular retailer, a particular supplier, a particular merchandise line, etc. The budget rules will be generated based upon data associated with the specific contract.

In a step 410, a set of budget rules is generated based on the received current document data including the indication of the contract associated with the business rules. For example, the budget rules may be generated based on a remaining budget that is available based on current factors such as actual purchase turnover, actual returns, actual goods received, etc. The budget rules may further be generated based on any other factors. For example, determination may be made whether the budget rule is to be created to apply to purchase orders received during a planning and buying phase or to purchase orders received during an in-season or selling phase. According to alternative embodiment, further alternatives may be provided to modify to scope and/or focus of the budget rules to be created. For example, budget rules may also be created to apply to specific stores, specific merchandise, etc.

In a step 415, new budget rules or modifications to existing budget rules are calculated for a sub-period within a planning period. A sub-period may be a week, a month, a year or any other time period within a planning period. Alternatively, budget rules may be calculated to apply to the entire period.

According to an exemplary embodiment, the budget rules are limits equal to the values of planned receipts minus pending purchase orders minus open purchase orders minus forecasted purchase orders minus receipts. The values are generally obtained by accessing data stored with ODS 324. The budget rules are roughly equivalent to the inflows minus all outflows for a sub-period. The amount remaining is the amount that is available to purchase merchandise for the sub-period.

Following calculation of the budget rules for the sub-period, the sub-period may be incremented to create a set of budget rules for the next period within the planning period and step 415 may be repeated. This iterative step may be repeated for each sub-period within the planning period to create a set of budget rules.

Following generation of the one or more budget rules, the rule or set of rules may be transferred from data processing system 320 to user computing system 310 in a step 420. The budget rules may be transferred periodically, based upon receipt of a purchase order, based on a detected change in one or more budget rules, based on manual inputs, etc. In some embodiments, the budget rules for one or more delivery periods may occur well into the future. As noted above, the system 300 allows for recalculation of the planned budget either manually or automatically.

The result of the calculation may be allocated to different order periods. For example, a set of budget rules that are calculated for a first period in step 415 may be associated with a first period, while a second iteration of step 415 is associated with a second period, etc.

Figure 5:
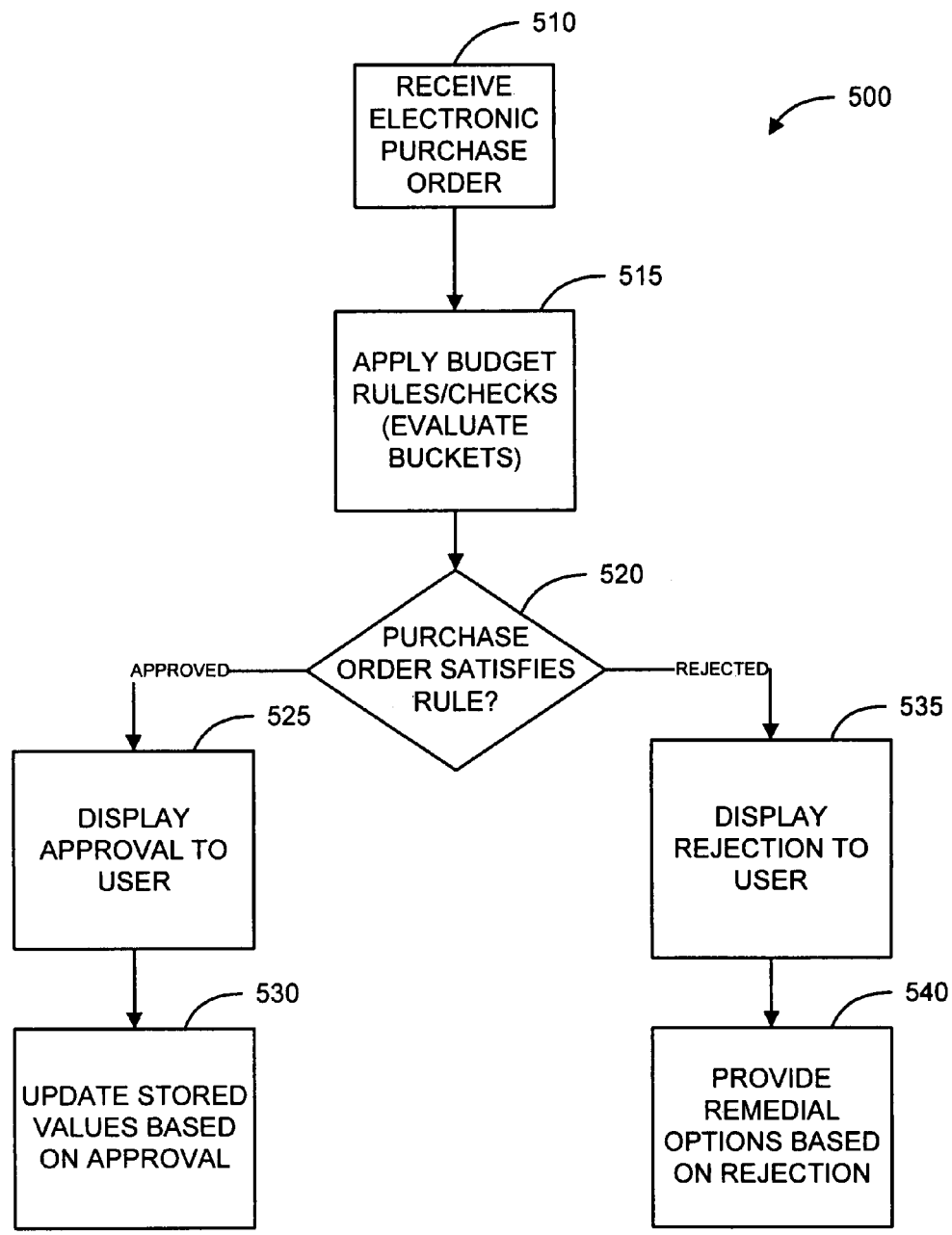
FIG. 5 is a flow chart illustrating a method for processing electronic purchase orders according to an exemplary embodiment.

Referring now to FIG. 5, a flow chart 500 illustrating a method for processing electronic purchase orders is shown according to an exemplary embodiment. Electronic purchase orders are processed by applying one or more rules to the electronic purchase order to determine whether the purchase order is allowable according to the rules.

In a step 510, an electronic purchase order is received. The electronic purchase order for a sub-period may be received based upon user input through user interface 312 as described above. Alternatively, the electronic purchase order may be automatically generated. For example, the method for processing purchase orders may be used in conjunction with an inventory management system configured to automatically create purchase orders based on levels of inventory, changes in inventory, etc.

In a step 515, one or more budget rules are applied to the purchase order. Applying one or more budget rules to the purchase order may include subtracting the total cost under the purchase order from the amount of money available for purchasing to determine whether the total cost is less than the amount of money available. In case of OTB allocation of planned budgets the order period and delivery period have to get determined/accessed. Following application of the one or more rules, a determination is made in step 520 whether the total cost of the purchase order is less than the amount of money available.

If the total cost of the purchase order is less than the amount of money available, the purchase order is approved in a step 525. Approval of the purchase order includes displaying an indicia to the user through user interface 222 to indicate that the purchase order is approved. Following approval of the purchase order, it may be necessary to update used budget module 216 in a step 530. In particular, the pending orders for the particular sub-period described in the purchase order are increased by an amount equal to the total cost of the purchase order.

Approval of the order may also include providing the user with the option to take one or more additional steps. For example, the user may be provided with an option to automatically forward the approved purchase order to the supplier for which the purchase was generated.

If the total cost of the purchase order is more than the amount of money available, the purchase order is rejected in a step 535. Rejection of the purchase order includes displaying an indicia to the user through user interface 222 to indicate that the purchase order is rejected and is generally accompanied by the reason for the rejection. For example, in some embodiments, the placement of a purchase order may require the existence of a budget bucket for the corresponding delivery period and order period. If no such bucket exists or the bucket has insufficient funds, the indicia may include a message such as "NO BUCKET FOR REQUESTED ORDER."

Following rejection of the purchase order, the user may be provided with one or more options based upon the rejection in a step 540. For example, the user may be provided with an opportunity to amend the purchase order such that the purchase order will be accepted with procurement module 220. Further, system 300 may be configured to provide the user with feedback indicating an allowable purchase order amount. According to an exemplary embodiment, system 300 is configured to initiate a procurement function based upon a rejection of the electronic purchase order, wherein the user may be presented with one or more options for remedial actions to facilitate acceptance of the purchase order.

Figure 6:
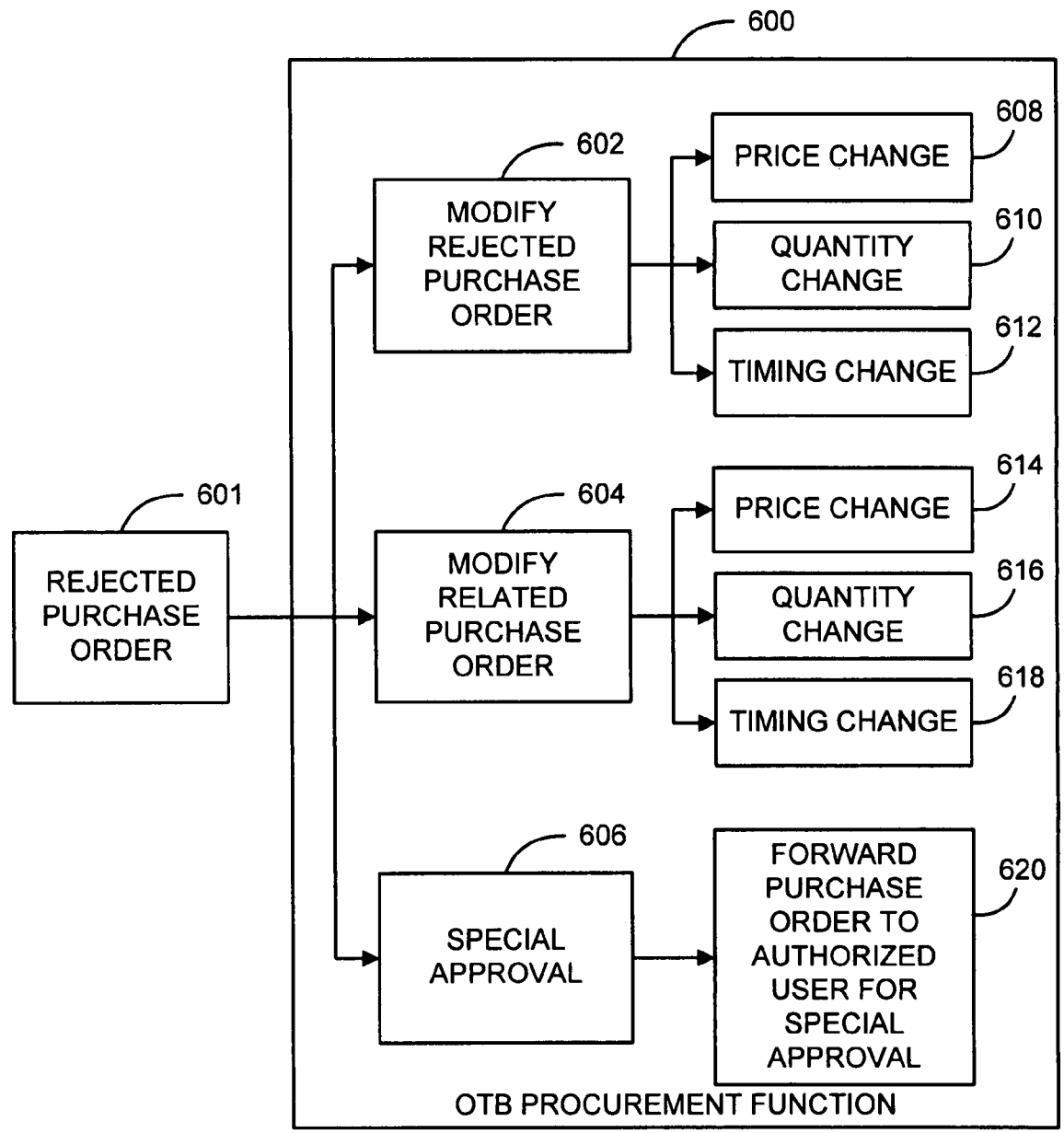
FIG. 6 is a diagram illustrating an OTB procurement function configured to facilitate acceptance of a rejected purchase order according to an exemplary embodiment.

FIG. 6 illustrates an OTB procurement function 600 configured to facilitate acceptance of a rejected purchase order 601 according to an exemplary embodiment. In the illustrated embodiment, OTB procurement function 600 is configured to provide an option 602 for modification of rejected purchase order 601, an option 604 for cancellation or modification of a related purchase order, and an option 606 for submission of rejected purchase order 601 for special approval. In other embodiments of OTB procurement function 600, additional, fewer, or differing options may be included. According to an exemplary embodiment, when the purchase order is rejected, the amount of available budget is temporarily reserved and the OTB procurement function is executed for the difference between the cost of the purchase order and the amount of available budget.

Option 602 is configured to redisplay rejected purchase order 601 to the user such that the user can modify one or more parameters of rejected purchase order 601 and resubmit rejected purchase order 601 such that it will be accepted. For example, in the illustrated embodiment, modifications to parameters of rejected purchase order 601 may include modifications 608 to the price, modifications 610 to the quantity of items in rejected purchase order 601 or other modifications to the total cost or value of rejected purchase order 601 to an allowable amount, such as the available budget amount. Modifications may also include modifications 612 to a temporal period or date for rejected purchase order 601, such as a delivery date, deadline, etc., to shift the purchase order to a period in which a sufficient budget amount is available. In other embodiments, additional, fewer, or different modifications may be made to parameters of rejected purchase order 601. Once rejected purchase order 601 has been modified, it may then be resubmitted so that the rule in step 515 may again be applied to rejected purchase order 601 as modified for approval.

Option 604 is configured to facilitate the modification or cancellation of a purchase order related to rejected purchase order 601 such that rejected purchase order 601 may be accepted upon resubmission. For example, option 604 may allow the user to modify one or more parameters of a purchase order associated with the same budget as or a budget related to rejected purchase order 601 such that a sufficient amount of funding will be available upon resubmission of rejected purchase order 601. In the illustrated embodiment, exemplary modifications to parameters of the related purchase order may include modifications 614 to the price, modifications 616 to the quantity of items in the related purchase order or other modifications to the total cost or value of the related purchase order, and modifications 618 to a temporal period or date for the related purchase order, such as the delivery date or deadline for the related purchase order, etc. In other embodiments, additional, fewer, or different modifications may be made to parameters of related purchase orders. Once the related purchase order has been modified or canceled, it may then be resubmitted so that the rule in step 515 may again be applied to rejected purchase order 601 for approval.

According to an exemplary embodiment, OTB procurement function 600 may also provide a reporting feature that facilitates the modification of one or more parameters of rejected purchase order 601, or a related purchase order. For example, the reporting feature may be configured to provide the user with feedback based on the rejection to advise the user in making amendments to rejected purchase order 601. Exemplary feedback may include providing the user with feedback indicating an allowable purchase order amount, limitations on the number of items that can be ordered, limitations on the total cost for rejected purchase order 601, limitations on the time frame for rejected purchase order 601, description of other pending purchase orders, etc. The reporting feature may also provide the user with a listing of existing purchase orders that are related to rejected purchase order 601. For example, the reporting feature may be configured to provide the user with a listing of all purchase orders associated with the same budget as or a budget related to rejected purchase order 601, a listing of similarly rejected purchase orders, a listing of all changeable purchase orders for a similar budgeting period, etc. According to an exemplary embodiment, the user may be provided with a listing of existing purchase orders associated with the same budget as or a budget related to rejected purchase order 601, which are currently preventing rejected purchase order 601 from being approved according to a budget rule.

Option 606 is configured to facilitate submission of rejected purchase order 601 for special approval in a step 620. For example, using option 606, rejected purchase order 601 may be forwarded without modification to a user in a class of users having authorization to approve rejected purchase order 601 by modifying or suspending the budget rules under which the purchase order was rejected. Such an authorized user may then be provided with an option to modify or suspend one or more of the rules such that rejected purchase order 601 will be allowed. According to an exemplary embodiment, if an authorized user decides to allow the rejected purchase order 601, the budget rule is suspended, and rejected purchase order 601 is directly released without modification. In this embodiment, the cost or value of rejected purchase order 601 which exceeds the cost or amount allowed under the budget rule may be reported to system 300 as a negative amount to be reconciled in a subsequent budget planning revision.

OTB procurement function 600 may further include constraints on a user's ability to modify the rules. For example, OTB procurement function 600 may include logic dictating that the user will only be allowed to modify rules for a first sub-period based upon a correlating change to a second sub-period. For example, a user may be able to increase the amount of money available in the first sub-period by decreasing the amount available in the second sub-period.

Purchase order processing may further include processing modifications and/or cancellations of existing purchase orders. Modifications that increase existing purchase order amounts may be processed as described above with the amount of the increase in the existing purchase order being treated as a new purchase order for that amount. Modifications to existing purchase order and/or cancellations of existing purchase orders may be processed without requiring approval or rejection. The budget rules may be modified to increase the amount of money available based upon a decrease or cancellation.

Although described in the context of purchase order processing for retail operations, system 300 may alternatively be applied to any system for processing electronic purchase orders by applying one or more rules to an electronic purchase order.

Embodiments within the scope of the present description include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

In some instances, the embodiments disclosed herein may be implemented by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The present invention in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A method of processing a first purchase order, the method comprising:
   receiving data regarding the first purchase order in a requestor computing system from a requestor;
   determining by a computer system that the first purchase order violates at least one budge rule; wherein the at least one budget rule is associated with other pending purchase orders;
   rejecting by the computer system the first purchase order based on the determination that the first purchase order violates the at least one budget rule;
   generating by the computer system a plurality of remedial options that overcome the rejection, the remedial options having characteristics which are determined by the requestor computing system based on the determination; and wherein the remedial options comprise modifying at least one parameter of the first order and modifying at least one parameter of at least one pending order of the other pending orders associated with the at least one budget rule that are retrieved from a database;
   presenting by the computer system the generated plurality of remedial options to the requestor based on the determination for required modifications for the acceptance of the current purchase order;
   receiving by the computer system a selected option from the requestor computer system; and
   the computing system implementing at least one of the selected option by
      if the option selected modifies a parameter of the first order, then the first order is reevaluated based on the at least one budget rule; or
      if the option selected modifies a parameter of the at least one pending order, then the at least one budget rule is modified based on the modified pending order and the first order is reevaluated based on the modified at least one budget rule.

2. The method of claim 1, wherein the at least one parameter of the first purchase order is at least one of a price, a quantity, a cost, a temporal period, and a date associated with the first purchase order.

3. The method of claim 1, wherein receiving a selected option includes receiving user input from a graphical user interface.

4. The method of claim 1, wherein the reevaluating the first order based on the at least one budget rule includes comparing a cost associated with the modified first purchase order to an amount of available funding in a budget associated with the modified first purchase order.

5. The method of claim 1, wherein the at least one parameter of the at least one pending order is at least one of a price, a quantity, a cost, a temporal period, and a date associated with the at least one pending order.

6. The method of claim 1, wherein receiving a modification to the at least one other purchase order includes receiving user input from a graphical user interface.

7. The method of claim 1, wherein the reevaluating the first purchase order based on the modified budget rule includes comparing a cost associated with the first purchase order to an amount of available funding in a budget associated with the first purchase order.

8. The method of claim 1, wherein providing remedial options to facilitate acceptance of the purchase order includes providing an option to submit the purchase order to a user having authorization to approve the purchase order.

9. The method of claim 8, wherein the user having authorization to approve the purchase order is provided with an option to approve the purchase order by one of modifying the at least one rule and suspending application of the at least one rule.

10. The method of claim 1, wherein the purchase order includes purchasing data for at least one of a service and a product.

11. The method of claim 1, wherein the purchase order is an electronic purchase order.

12. The method of processing a purchase order of claim 1, wherein generating the remedial options includes generating at least one of: an opportunity to amend the purchase order, suggest one of an amount or time limitation, initiate a procurement, delay the purchase order, modify other related purchase orders and a list of existing purchase orders.

13. A system for processing a purchase order, the system comprising:
   a requestor computing system configured to receive data regarding the purchase order from a requestor, the purchase order having a cost;
   a computer system configured to determine the first purchase order violates at least one budget rule; wherein the at least one budget rule is associated with other pending purchase orders;
   the computing system configured to reject the purchase order based on the determination that the first purchase order violates the at least one budget rule;
   the computing system configured to generate a plurality of remedial options that overcome the rejection, the remedial options having characteristics which are determined by a computing system based on the determination rejection; and wherein the remedial options comprise modifying at least one parameter of the first order and modifying at least one parameter of at least one pending order of the other pending orders associated with the at least one budget rule that are retrieved from a database;
   the computing system configured to present the generated plurality of remedial options to a requestor computing system based on the determination for required modifications for the acceptance of the current purchase order;
   the computing system configured to receive a selected option from the requestor computing system; and
   the computing system configured to implement at least one of the selected option by:
      if the option selected modifies a parameter of the first order, then the first order is reevaluated based on the at least one budget rule; or
      if the option selected modifies a parameter of the at least one pending order, then the at least one budget rule is modified based on the modified pending order and first order is reevaluated based on the modified at least one budget rule.

14. The system of claim 13, wherein the computing system configured to generate remedial options is further configured to provide an option to submit the purchase order to a user having authorization to approve the purchase order;
   wherein the computing system is configured to provide the user having authorization to approve the purchase order with an option to approve the purchase order by one of modifying the at least one rule and suspending application of the at least one rule.

15. The system of claim 14, wherein the at least one parameter of the first purchase order parameter is at least one of a price, a quantity, a cost, a temporal period, and a date associated with the purchase order.

16. The system of claim 14, wherein the computing system configured to receive a modification to the purchase order is configured to receive user input from a graphical user interface.

17. The system of claim 14, wherein the computing system configured to apply the at least one rule to the modified first purchase order is configured to compare a cost associated with the modified first purchase order to an amount of available finding in a budget associated with the modified first purchase order.

18. The system of claim 13, wherein the at least one parameter of the at least one pending order is at least one of a price, a quantity, a cost, a temporal period, and a date associated with the at least one pending order.

19. The system of claim 13, wherein the computing system configured to receive a modification to the second purchase order is configured to receive user input from a graphical user interface.

20. The system of claim 13, wherein the computing system configured to reevaluate the first purchase order based on the modified bud et rule compares a cost associated with the first purchase order to an amount of available funding in a budget associated with the first purchase order.

21. The system of claim 13, wherein the purchase order includes purchasing data for at least one of a service and a product.

22. The system of claim 13, wherein the purchase order is an electronic purchase order.

23. The system of claim 13, wherein the computer system configured to generate remedial options is further configured to generate options including at least one: an opportunity to amend the purchase order, suggest at least one of an amount or time limitation, initiate a procurement, delay the purchase order, modify other related purchase orders and a list of existing purchase orders.

24. A program product for processing a purchase order, the program product comprising machine-readable program code for causing, when executed, one or more machines to perform the following method steps:
   receiving data regarding the first purchase order in a computerized system from a requestor;
   determining that the first purchase order violates at least one budge rule; wherein the at least one budget rule is associated with other pending purchase orders;
   rejecting the first purchase order based on the determination that the first purchase order violates the at least one budget rule;
   generating a plurality of remedial options that overcome the rejection, the remedial options having characteristics which are determined by a computing system based on the determination; and wherein the remedial options comprise modifying at least one parameter of the first order and modifying at least one parameter of at least one pending order of the other pending orders associated with the at least one budget rule that are retrieved from a database;
   presenting to a display the generated plurality of remedial options to the requestor based on the determination for required modifications for the acceptance of the current purchase order
   receiving a selected option from the requestor; and
   implementing at least one of the selected option by
      if the option selected modifies a parameter of the first order, then the first order is reevaluated based on the at least one budget rule; or
      if the option selected modifies a parameter of the at least one pending order, then the at least one budget rule is modified based on the modified pending order and the first order is reevaluated based on the modified at least one budget rule.

25. The program product of claim 24, wherein the generating remedial options further includes an option to submit the purchase order to a user having authorization to approve the purchase order; and further providing the user having authorization to approve the purchase order with an option to approve the purchase order by one of modifying the at least one rule and suspending application of the at least one rule.

26. The program product of claim 25, at least one parameter of the first purchase order is at least one of a price, a quantity, a cost, a temporal period, and a date associated with the first purchase order.

27. The program product of claim 25, wherein the reevaluating the first purchase order based on the modified budget rule includes comparing a cost associated with the modified purchase order to an amount of available funding in a budget associated with the modified purchase order.

28. The program product of claim 24, wherein the at least one parameter of at the least one pending order is at least one of a price, a quantity, a cost, a temporal period, and a date associated with the at least one pending order.

29. The program product of claim 24, wherein receiving a modification to the second purchase order includes receiving user input from a graphical user interface.

30. The program product of claim 24, wherein the reevaluating of the first purchase order based on the modified budget rule includes comparing a cost associated with the first purchase order to an amount of available funding in a budget associated with the first purchase order.

31. The program product of claim 24, wherein the purchase order includes purchasing data for at least one of a service and a product.

32. The program product of claim 24, wherein the purchase order is an electronic purchase order.

33. The program product of claim 24, wherein generating remedial options includes generating at least one of: an opportunity to amend the purchase order, suggest at least one of an amount or time limitation, initiate a procurement, delay the purchase order, modify other related purchase orders and a list of existing purchase orders.

* * * * *

UNITED STATES PATENT AND TRADEMARK OFFICE
CERTIFICATE OF CORRECTION

PATENT NO. : 7,660,742 B2
APPLICATION NO. : 10/932913
DATED : February 9, 2010
INVENTOR(S) : Biwer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 467 days.

Signed and Sealed this

Thirtieth Day of November, 2010

David J. Kappos
*Director of the United States Patent and Trademark Office*